United States Patent
Kobayashi et al.

(10) Patent No.: US 9,061,685 B2
(45) Date of Patent: Jun. 23, 2015

(54) DRIVE STATE CONTROL APPARATUS FOR VEHICLE

(75) Inventors: Kazutaka Kobayashi, Nishio (JP); Yoshiyuki Aoyama, Nishio (JP); Takeshige Miyazaki, Chiryu (JP); Akihiro Ohno, Okazaki (JP); Ryohei Shigeta, Anjo (JP); Tomoaki Kato, Kariya (JP); Go Nagayama, Toyama (JP)

(73) Assignees: Aisin AI Co., Ltd., Nishio-Shi (JP); JTEKT Corporation, Osaka-Shi (JP)

(*) Notice: Subject to any disclaimer, the term of this patent is extended or adjusted under 35 U.S.C. 154(b) by 344 days.

(21) Appl. No.: 13/033,944

(22) Filed: Feb. 24, 2011

(65) Prior Publication Data

US 2011/0257858 A1 Oct. 20, 2011

(30) Foreign Application Priority Data

Feb. 26, 2010 (JP) .................................. 2010-41335

(51) Int. Cl.
*B60K 28/16* (2006.01)
*B60K 23/08* (2006.01)
*G06F 17/00* (2006.01)
(Continued)

(52) U.S. Cl.
CPC .......... *B60W 30/18172* (2013.01); *B60K 28/16* (2013.01); *B60K 17/3462* (2013.01); *B60K 17/35* (2013.01); *B60K 23/08* (2013.01); *B60K 23/0808* (2013.01); *B60W 10/06* (2013.01);
(Continued)

(58) Field of Classification Search
CPC .... B60K 17/34; B60K 17/344; B60K 17/346; B60K 17/3462; B60K 17/3465; B60K 17/35; B60K 17/3505; B60K 17/351; B60K 17/354; B60K 23/08; B60K 23/0808; B60K 28/16; B60K 28/165; B60T 8/172; B60T 8/175; B60T 8/176
USPC ......... 701/68, 69, 74; 180/197, 233, 245–249
See application file for complete search history.

(56) References Cited

U.S. PATENT DOCUMENTS 4,781,266 A * 11/1988 Hotta et al. .................... 180/248
5,030,185 A *  7/1991 Kawamura .................... 475/227
(Continued)

FOREIGN PATENT DOCUMENTS

JP   2003-220847 A1   8/2003
JP   2004-009954 A1   1/2004
(Continued)

*Primary Examiner* — Jack W Keith
*Assistant Examiner* — Chuong P Nguyen
(74) *Attorney, Agent, or Firm* — Burr & Brown, PLLC

(57) ABSTRACT

A drive state control apparatus is applied to a vehicle which has not only a transfer including a multi-disc clutch mechanism but also a changeover mechanism interposed in an axle and which can be switched between 2WD and 4WD. When a 2WD-to-4WD changeover condition is satisfied, the multi-disc clutch is immediately switched from a "decoupled state" to a "coupled state." Meanwhile, a connecting operation of the changeover mechanism is started upon establishment of a state in which left and right rear wheels have no acceleration slippage, and a state in which rotational speeds of first and second axles on opposite sides of the changeover mechanism are approximately equal to each other. In addition, in the case where the left and right rear wheels have acceleration slippage after the 2WD-to-4WD changeover condition has been satisfied, an E/G output reduction control is executed. Thus, the connecting operation can be performed smoothly.

4 Claims, 7 Drawing Sheets

(51) Int. Cl.
  *B60W 30/18* (2012.01)
  *B60K 17/346* (2006.01)
  *B60W 10/119* (2012.01)
  *B60K 17/35* (2006.01)
  *B60W 10/06* (2006.01)
  *F02D 29/02* (2006.01)

(52) U.S. Cl.
  CPC ........ *B60W 10/119* (2013.01); *B60W 2520/28* (2013.01); *B60W 2720/28* (2013.01); *F02D 29/02* (2013.01)

(56) References Cited

U.S. PATENT DOCUMENTS

| | | | | |
|---|---|---|---|---|
| 5,699,871 | A * | 12/1997 | Hara et al. | 180/247 |
| 5,754,970 | A * | 5/1998 | Takasaki et al. | 701/87 |
| 6,016,883 | A * | 1/2000 | Yamada | 180/247 |
| 6,902,511 | B2 * | 6/2005 | Shimizu et al. | 477/4 |
| 6,962,226 | B2 * | 11/2005 | Goto et al. | 180/233 |
| 7,074,150 | B2 * | 7/2006 | Fusegi et al. | 475/150 |
| 7,140,460 | B2 * | 11/2006 | Shimizu et al. | 180/65.225 |
| 7,490,690 | B2 * | 2/2009 | Ohno et al. | 180/247 |
| 8,256,559 | B2 * | 9/2012 | Kato et al. | 180/248 |
| 8,620,546 | B2 * | 12/2013 | Kobayashi et al. | 701/69 |
| 8,622,164 | B2 * | 1/2014 | Takaira | 180/247 |
| 2006/0124374 | A1 * | 6/2006 | Katada et al. | 180/233 |
| 2009/0229905 | A1 * | 9/2009 | Kato et al. | 180/249 |
| 2014/0135168 | A1 * | 5/2014 | Yokoo | 477/8 |

FOREIGN PATENT DOCUMENTS

| | | |
|---|---|---|
| JP | 2004-359132 A1 | 12/2004 |
| JP | 3650255 B2 | 5/2005 |
| JP | 2008-062929 A1 | 3/2008 |

* cited by examiner

DRIVE STATE CONTROL APPARATUS FOR VEHICLE

BACKGROUND OF THE INVENTION

1. Field of the invention

The present invention relates to a drive state control apparatus for a vehicle which can perform changeover between a two-wheel drive state and a four-wheel drive state.

2. Description of the related art

Conventionally, there has been widely known a transfer which includes an input shaft, a first output shaft, and a second output shaft (see, for example, Japanese Patent No, 3650255). Such a transfer includes a first changeover mechanism which can be switchable between a "first state" (corresponding to a two-wheel drive state) in which a power transmission system is formed only between the input shaft and the first output shaft, and a "second state" (corresponding to a four-wheel drive state) in which a power transmission system is formed between the input shaft and the first output shaft, and another power transmission system is formed between the input shaft and the second output shaft. This first changeover mechanism may be a multi-disc clutch mechanism, a dog-type (a spline-engagement type) changeover mechanism, or the like.

The input shaft is connected to an output shaft of a transmission connected to an engine of a vehicle. In general, the first and second output shafts are respectively connected to rear-wheel-side and front-wheel-side propeller shafts of the vehicle. The front-wheel-side propeller shaft is connected to left and right front wheels via a front-wheel-side differential, and the rear-wheel-side propeller shaft is connected to left and right rear wheels via a rear-wheel-side differential.

In the case of the vehicle equipped with such a transfer, when the first changeover mechanism is in the "first state", there is established a "two-wheel drive state" in which a power transmission system is formed only between the engine and the left and right rear wheels. Meanwhile, when the first changeover mechanism is in the "second state", there is established a "four-wheel drive state" in which a power transmission system is formed between the engine and the left and right rear wheels and another power transmission system is formed between the engine and the left and right front wheels. In this way, the "two-wheel drive state" and the "four-wheel drive state" are selectively established in accordance with the state of the first changeover mechanism.

Incidentally, there has been also widely known a vehicle which is equipped with the above-described transfer and a second changeover mechanism which is interposed in the axle of one of the left and right front wheels (a specific wheel). The second changeover mechanism is configured to be selectively switched to a "connected state" in which a power transmission system is formed between the specific wheel and the front-wheel-side differential, or a "disconnected state" in which no power transmission system is formed between the specific wheel and the front-wheel-side differential. The second changeover mechanism may be a dog-type (a spline-engagement type) changeover mechanism or the like.

In the case of a vehicle which includes not only the above-described transfer but also the above-described second changeover mechanism, when the vehicle is in the "four-wheel drive state" the first changeover mechanism is in the "second state," and the second changeover mechanism is in the "connected state." Meanwhile, when the vehicle is in the "two-wheel drive state," the first changeover mechanism is in the "first state," and the second changeover mechanism is in the "disconnected state." As a result, when the vehicle is traveling in the "two-wheel drive state," idle rotation of the front-wheel-side propeller shaft can be prevented (restrained).

Accordingly, in the "two-wheel drive state," drive energy required for idle rotation of the front-wheel-side propeller shaft having a relatively large moment of inertia becomes unnecessary. As a result, fuel efficiency can be improved as compared with a vehicle which is not equipped with such a second changeover mechanism (that is, a vehicle in which idle rotation of the front-wheel-side propeller shaft occurs in the "two-wheel drive state").

In the following description, there is assumed a case where a changeover condition for changeover from the "two-wheel drive state" to the "four-wheel drive state" is satisfied when a vehicle which includes the above-described second changeover mechanism in addition to the above-described transfer is traveling in the "two-wheel drive state." In this case, an operation of switching the first changeover mechanism from the "first state" to the "second state" (hereinafter referred to as "changeover operation") is performed, and an operation of switching the second changeover mechanism from the "disconnected state" to the "connected state" (hereinafter referred to as "connecting operation") is performed. In the following description, in order to facilitate explanation, a portion of the axle of the specific wheel located between the second changeover mechanism and the specific wheel will be referred to as the "first axle"; and a portion of the axle of the specific wheel located between the second changeover mechanism and the front-wheel-side differential will be referred to as the "second axle."

In particular, in the case where the second changeover mechanism is constituted by a dog-type (a spline-engagement type) changeover mechanism, in order to smoothly perform the connecting operation of the second changeover mechanism without use of a rotation synchronizing apparatus (synchronizer), the rotational speeds of the first and second axles must be (approximately) equal to each other during the connecting operation. In order that the rotational speeds of the first and second axles become (approximately) equal to each other, the rotational speed of the front-wheel-side propeller shaft must be (approximately) equal to a "value obtained by multiplying the rotational speed of the left and right front wheels by a differential gear ratio."

As described above, in the "two-wheel drive state," the front-wheel-side propeller shaft is (substantially) stopped. Accordingly, before completion of the changeover operation of the first changeover mechanism, there may arise a situation where the rotational speed of the front-wheel-side propeller shaft is smaller than the rotational speed of the rear-wheel-side propeller shaft, and the rotational speed of the front-wheel-side propeller shaft is smaller than the value obtained by multiplying the rotational speed of the left and right front wheels by the differential gear ratio." Also, after completion of the changeover operation of the first changeover mechanism, the rotational speed of the front-wheel-side propeller shaft becomes equal to the rotational speed of the rear-wheel-side propeller shaft However, even after completion of the changeover operation of the first changeover mechanism, if slippage in an acceleration direction is occurring at the left and right rear wheels, there may arise a situation where the rotational speed of the left and right rear wheels is greater than the rotational speed of the left and right front wheels, and the rotational speed of the front-wheel-side propeller shaft is greater than the "value obtained by multiplying the rotational speed of the left and right front wheels by the differential gear ratio."

Because of the above-described phenomena, a situation where the rotational speeds of the first and second axles do not become (approximately) equal to each other may arise before and after completion of the changeover operation of the first changeover mechanism which is performed upon satisfaction of the above-described changeover condition. Accordingly, if a rotation synchronizing apparatus (synchronizer) is not provided, there may arise a situation where the connecting operation of the second changeover mechanism cannot be performed smoothly during traveling of the vehicle.

SUMMARY OF THE INVENTION

The present invention has been accomplished in order to solve the above-described problems, and an object of the present invention is to provide a drive state control apparatus which is applied to a vehicle equipped with not only a transfer having a first changeover mechanism but also a second changeover mechanism and which can smoothly perform connecting operation of the second changeover mechanism without use of a rotation synchronizing apparatus (synchronizer) while the vehicle is traveling in a "two-wheel drive state."

A drive state control apparatus for a vehicle according to the present invention is applied to a vehicle which includes a transfer, a first differential, a second differential, and a second changeover mechanism. The transfer include an input shaft connected to an output shaft of a transmission connected to a power source of the vehicle, a first output shaft connected to one of front-wheel-side and rear-wheel-side propeller shafts of the vehicle (first propeller shaft), a second output shaft connected to the other of the front-wheel-side and rear-wheel-side propeller shafts (second propeller shaft), and a first changeover mechanism which is switchable between a first state in which a power transmission system is formed only between the input shaft and the first output shaft and a second state in which power transmission systems are formed between the input shaft and the first and second output shafts.

The first differential is connected to the first propeller shaft and distributes torque of the first propeller shaft to left and right front wheels or left and right rear wheels (first left and right wheels) via axles of the first left and right wheels, while allowing difference in rotational speed between the first left and right wheels. The second differential is connected to the second propeller shaft and distributes torque of the second propeller shaft to the remaining left and right wheels (second left and right wheels) via axles of the second left and right wheels, while allowing difference in rotational speed between the second left and right wheels.

The second changeover mechanism is interposed in an axle of one of the second left and right wheels (specific wheel), and is switchable between a connected state in which a power transmission system is formed between the specific wheel and the second differential, and a disconnected state in which no power transmission system is formed between the specific wheel and the second differential.

The vehicle travels in a two-wheel drive state when the first changeover mechanism is in the first state and the second changeover mechanism is in the disconnected state, and travels in a four-wheel drive state when the first changeover mechanism is in the second state and the second changeover mechanism is in the connected state, The first propeller shaft can be the front-wheel-side propeller shaft; the second propeller shaft can be the rear-wheel-side propeller shaft; the first left and right wheels can be the left and right front wheels; and the second left and right wheels can be the left and right rear wheels. However, preferably, the first propeller shaft is the rear-wheel-side propeller shaft; the second propeller shaft is the front-wheel-side propeller shaft; the first left and right wheels are the left and right rear wheels; and the second left and right wheels are the left and right front wheels.

Preferably, the first changeover mechanism is a multi-disc clutch mechanism which is switchable between a decoupled state in which no power transmission system is formed between the first output shaft and the second output shaft whereby the first state is established, and a coupled state in which a power transmission system is formed between the first output shaft and the second output shaft whereby the second state is established, the multi-disc clutch mechanism being capable of adjusting a maximum torque which can be transmitted in the coupled state.

Preferably, the second changeover mechanism is a dog-type clutch mechanism which is selectively brought into the connected state and the disconnected state. Specifically, the dog-type clutch mechanism includes a hub (outer spline or inner spline) united with one of first and second axles to be described later, a sleeve (inner spline or outer spline) spline-engaged with the hub, a piece (outer spline or inner spline) united with the other of the first and second axles, and a fork for adjusting the position of the sleeve. When the sleeve is located in a first position, the piece and the sleeve spline-engage with each other, whereby the connected state is established. When the sleeve is located in a second position, the piece and the sleeve do not spline-engage with each other, whereby the disconnected state is obtained.

The drive state control apparatus for a vehicle according to the present invention comprises first rotational speed acquisition means for acquiring rotational speed of a first axle, which is a portion of the axle of the specific wheel located between the second changeover mechanism and the specific wheel; second rotational speed acquisition means for acquiring rotational speed of a second axle, which is a portion of the axle of the specific wheel located between the second changeover mechanism and the second differential; and control means for controlling the first changeover mechanism and the second changeover mechanism. The control means selectively controls the state (the first state or the second state) of the first changeover mechanism and the state (the disconnected state or the connected state) of the second changeover mechanism by use of actuators. The rotational speed of the first axle can be acquired from the rotational speed of the specific wheel detected by a corresponding sensor. The rotational speed of the second axle can be acquired from the rotational speed of one of the second left and right wheels which differs from the specific wheel detected by a corresponding sensor, and the rotational speed of the second propeller shaft detected by a corresponding sensor.

The feature of the drive state control apparatus for a vehicle according to the present invention resides in that the control means is configured such that, when a condition for changeover from the two-wheel drive state to the four-wheel drive state is satisfied while the vehicle is traveling in the two-wheel drive state, the control means switches the first changeover mechanism from the first state to the second state, and starts a connecting operation for switching the second changeover mechanism from the disconnected state to the connected state, upon determination that a difference between the acquired rotational speeds of the first and second axles is less than a predetermined value.

By virtue of this feature, it is guaranteed that, in the case where the condition for changeover from the two-wheel drive state to the four-wheel drive state is satisfied, the connecting operation of the second changeover mechanism (operation of switching the second changeover mechanism from the disconnected state to the connected state) is started in a state in which the rotational speeds of the first and second axles are (approximately) equal to each other. Accordingly, while the vehicle is traveling in the two-wheel drive state, the connecting operation of the second changeover mechanism can be performed smoothly without use of a rotation synchronizing apparatus (synchronizer).

Preferably, the above-described drive state control apparatus further comprises determination means for determining whether or not slippage in an acceleration direction is occurring at least one of the first left and right wheels; and reduction means for reducing drive torques of the first left and right wheels upon determination that the slippage is occurring when the changeover condition is satisfied, wherein the control means starts the connecting operation upon determination that the difference between the acquired rotational speeds of the first and second axles is less than a predetermined value (and determination that no slippage occurs).

The reduction means may reduce the drive torques of the first left and right wheels by imparting brake torques to the first left and right wheels. Alternatively, the reduction means may reduce the drive torques of the first left and right wheels by reducing torque input to the input shaft of the transfer. The torque input to the input shaft of the transfer may be reduced by reducing the output of the power source.

As described above, in the case where the first left and right wheels have slippage in the acceleration direction, after completion of the changeover operation of the first changeover mechanism (that is, after the rotational speed of the second propeller shaft becomes equal to the rotational speed of the first propeller shaft), the rotational speeds of the first left and right wheels are greater than those of the second left and right wheels, and the rotational speed of the second propeller shaft becomes greater than the rotational speeds of the second left and right wheels. That is, the rotational speed of the second axle becomes greater than the rotational speed of the first axle. Accordingly, if the slippage of the first left and right wheels in the acceleration direction continues, the state in which the rotational speed of the second axle is greater than the rotational speed of the first axle continues. As a result, there may arise a case where a state in which the rotational speeds of the first and second axles become (approximately) equal to each other cannot be established. Accordingly, there may arise a case where the connecting operation of the second changeover mechanism cannot be started, which operation would otherwise be started upon satisfaction of the condition that the rotational speeds of the first and second axles are (approximately) equal to each other.

In contrast, according to the above-described configuration, in the case where the first left and right wheels have slippage when the changeover condition is satisfied, the drive torques of the first left and right wheels are reduced, whereby the slippage of the first left and right wheels can be suppressed. Thus, there can be secured a state in which the rotational speeds of the first and second axles are (approximately) equal to each other. As a result, even in the case where the first left and right wheels have slippage after the changeover condition has been satisfied, the connecting operation of the second changeover mechanism can be started relatively quickly.

In the above, there has been described a mode of the drive state control apparatus for a vehicle according to the present invention in which, when the condition for changeover from the two-wheel drive state to the four-wheel drive state is satisfied, "the first changeover mechanism is switched from the first state to the second state, and the connecting operation for switching the second changeover mechanism from the disconnected state to the connected state upon determination that the difference between the rotational speeds of the first and second axles is less than a predetermined value."

However, in the case where the drive state control apparatus for a vehicle according to the present invention comprises first rotational speed acquisition means for acquiring the rotational speed of the first output shaft, and second rotational speed acquisition means for acquiring the rotational speed of the second output shaft, the control means may be configured such that such that, when a condition for changeover from the two-wheel drive state to the four-wheel drive state is satisfied while the vehicle is traveling in the two-wheel drive state, the control means switches the second changeover mechanism from the disconnected state to the connected state, and starts a connecting operation for switching the first changeover mechanism from the first state to the second state, upon determination that a difference between the acquired rotational speeds of the first and second output shafts is less than a predetermined value.

In this case as well, it is guaranteed that, in the case where the condition for changeover from the two-wheel drive state to the four-wheel drive state is satisfied, the connecting operation of the first changeover mechanism (operation of switching the first changeover mechanism from the first state to the second state) is started in a state in which the rotational speeds of the first and second output shafts are (approximately) equal to each other. Accordingly, while the vehicle is traveling in the two-wheel drive state, the connecting operation of the first changeover mechanism can be performed without use of a rotation synchronizing apparatus (synchronizer).

In this case, preferably, the first changeover mechanism is the above-described dog-type clutch mechanism which is switchable between a decoupled state in which no power transmission system is formed between the first output shaft and the second output shaft whereby the first state is established, and a coupled state in which a power transmission system is formed between the first output shaft and the second output shaft whereby the second state is established.

Furthermore, preferably, the second changeover mechanism is a multi-disc clutch mechanism which is selectively brought into the connected state and the disconnected state and which can adjust a maximum torque which can be transmitted in the connected state.

DETAILED DESCRIPTION OF THE PREFERRED EMBODIMENTS INVENTION

Figure 1:
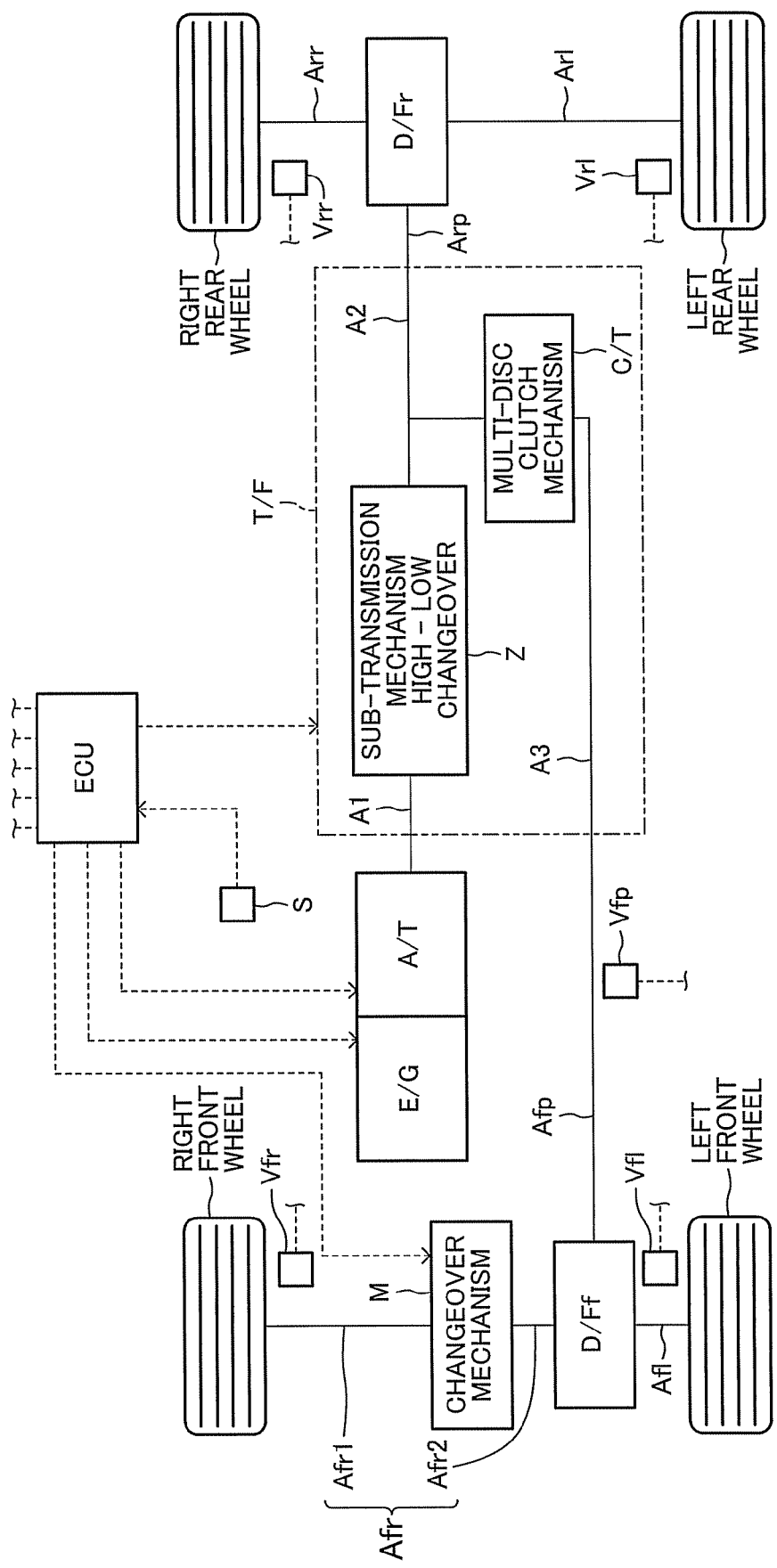
FIG. 1 is a diagram schematically showing a power transmission system of a vehicle on which a vehicular drive state control apparatus according to an embodiment of the present invention is mounted.

A drive state control apparatus for a vehicle according to an embodiment of the present invention will now be described with reference to the drawings. FIG. 1 shows the power transmission system of a drive system of a vehicle on which the drive state control apparatus according to the embodiment of the present invention is mounted. This drive system includes a transfer T/F, a rear-wheel-side differential D/Fr, a front-wheel-side differential D/Ff, a changeover mechanism M (corresponding to the above-described "second changeover mechanism"), wheel speed sensors Vfr, Vfl, Vrr, Vrl, a front-wheel-side propeller shaft rotational speed sensor Vfp, a 2WD/4WD changeover switch S, and an electronic control apparatus ECU.

The transfer T/F includes an input shaft A1, a first output shaft A2, and a second output shaft A3. The input shaft A1 is connected to an output shaft of an automatic transmission A/T connected to an engine E/G, and a power transmission system is formed between the input shaft A1 and the engine E/G. The first output shaft A2 is connected to the rear-wheel-side differential D/Fr via a rear-wheel-side propeller shaft Arp, and a power transmission system is formed between the first output shaft A2 and the rear-wheel-side differential D/Fr. The second output shaft A3 is connected to the front-wheel-side differential D/Ff via a front-wheel-side propeller shaft Afp, and a power transmission system is formed between the second output shaft A3 and the front-wheel-side differential D/Ff.

The transfer T/F includes a sub-transmission mechanism Z and a multi-disc clutch mechanism C/T ((corresponding to the above-described "first changeover mechanism"). The sub-transmission mechanism Z has one of known configurations, and is configured to be switchable between a HIGH mode in which the ratio of rotational speed of the first output shaft A2 to that of the input shaft A1 becomes "1," and a LOW mode in which the ratio becomes a constant value less than "1."

The multi-disc clutch mechanism C/T has one of known configurations, and is configured to be selectively switched to a "decoupled state" (corresponding to the above-described "first state") in which torque of the first output shaft A2 is not distributed to the second output shaft A3 (that is, a power transmission system is formed only between the input shaft A1 and the first output shaft A2), and a "coupled state" (corresponding to the above-described "second state") in which torque of the first output shaft A2 is distributed to the second output shaft A3 (that is, a power transmission system is formed between the input shaft A1 and the first output shaft A2 and another power transmission system is formed between the input shaft A1 and the second output shaft A3).

Specifically, the multi-disc clutch mechanism C/T can adjust the maximum torque that can be distributed to the second output shaft A3 (hereinafter referred to as the "multi-disc clutch transmission torque"). A state in which the multi-disc clutch transmission torque is "0" corresponds to the "decoupled state," and a state in which the multi-disc clutch transmission torque is greater than "0" corresponds to "the coupled state."

The rear-wheel-side differential D/Fr has one of known configurations, and distributes torque of the rear-wheel-side propeller shaft Arp to the left and right rear wheels via an axle Arr of the right rear wheel and an axle Arl of the left rear wheel. The rotational speeds of the axles Arl and Arr (rotational speeds of the left and right rear wheels) are adjusted to maintain a relation "the rotational speed of the rear-wheel-side propeller shaft=a differential gear ratio×(the rotational speed of the axle Arl+the rotational speed of the axle Arr)/2."

The front-wheel-side differential D/Ff has one of known configurations, and distributes torque of the front-wheel-side propeller shaft Afp to the left and right front wheels via an axle Afr of the right front wheel and an axle Afl of the left front wheel. The rotational speeds of the axles Afl and Afr (rotational speeds of the left and right front wheels) are adjusted to maintain a relation "the rotational speed of the front-wheel-side propeller shaft=a differential gear ratio×(the rotational speed of the axle Afl+the rotational speed of the axle Afr (specifically, the rotational speed of the second axle Afr2 to be described later))/2."

The changeover mechanism M is interposed in the axle Afr of the right front wheel (corresponding to the above-described "specific wheel"), and is configured to be switchable between a "connected state" in which a power transmission system is formed between the right front wheel and the front-wheel-side differential D/Ff, and a "disconnected state" in which no power transmission system is formed between the right front wheel and the front-wheel-side differential D/Ff. In the following description, a portion of the axle Afr of the right front wheel located between the changeover mechanism M and the right front wheel will be referred to as the "first axle Afr1"; and a portion of the axle Afr of the right front wheel located between the changeover mechanism M and the front-wheel-side differential D/Ff will be referred to as the "second axle Afr2." This changeover mechanism M is not equipped with a rotation synchronizing apparatus (synchronizer) for rendering the rotational speeds of the first and second axles Afr1 and Afr2 close to each other.

The changeover mechanism M has a configuration of, for example, a dog-type (a spline-engagement type). In this case, the changeover mechanism M includes, for example, a hub (outer spline or inner spline) united with one of the first and second axles Afr1 and Afr2, a sleeve (inner spline or outer spline) spline-engaged with the hub, a piece (outer spline or inner spline) united with the other of the first and second axles Afr1 and Afr2, and a fork for adjusting the position of the sleeve. When the sleeve is located in a first position, the piece and the sleeve spline-engage with each other, whereby the "connected state" is established. When the sleeve is located in a second position, the piece and the sleeve do not spline-engage with each other, whereby the "disconnected state" is obtained.

By virtue of the above-described configuration, when the multi-disc clutch mechanism UT is in the "decoupled state" and the changeover mechanism M is in the "disconnected state," the drive system establishes the two-wheel drive state (the rear-wheel drive state); and, when the multi-disc clutch mechanism C/T is in the "coupled state" and the changeover mechanism M is in the "connected state," the drive system establishes the four-wheel drive state. In the following description, the two-wheel drive may also be referred to as "2WD," and the four-wheel drive may also be referred to as "4WD."

The wheel speed sensors Vfr, Vfl, Vrr, Vrl respectively detect the rotational speeds of the corresponding wheels. The front-wheel-side propeller shaft rotational speed sensor Vfp detects the rotational speed of the front-wheel-side propeller shaft Afp. The 2WD/4WD changeover switch S is configured to enable a driver of the vehicle to select a "2WD mode" or a "4WD mode" by operating the switch.

The electronic control apparatus ECU is a microcomputer having one of known configurations. The electronic control apparatus ECU controls the states of the engine E/G and the automatic transmission A/T in accordance with the state of the vehicle. Furthermore, the electronic control apparatus ECU controls an actuator (not shown) for controlling the state of the sub-transmission mechanism Z (the HIGH mode or the LOW mode) on the basis of the state (position) of an operation member (not shown) operated by the driver.

In addition, the electronic control apparatus ECU controls an actuator (not shown) for controlling the state (multi-disc clutch transmission torque) of the multi-disc clutch mechanism C/T and an actuator (not shown) for controlling the state (the "connected state" or the "disconnected state") of the changeover mechanism M in accordance with the rotational speeds of the four wheels, the state of the 2WD/4WD changeover switch S, etc.

Specifically, in the case where the 2WD/4WD changeover switch S is set to the "2WD mode," the drive system is always maintained in the two-wheel drive state. Meanwhile, in the case where the 2WD/4WD changeover switch S is set to the "4WD mode," the drive system is usually maintained in the two-wheel drive state, and is switched from the two-wheel drive state to the four-wheel drive state only when a predetermined condition for switching from 2WD to 4WD (hereinafter referred to as the "2WD-to-4WD changeover condition") is satisfied.

In the present example, the 2WD-to-4WD changeover condition is satisfied when the "4WD mode" is selected and the left and right rear wheels are determined to have slippage in an acceleration direction (acceleration slippage). The left and right rear wheels are determined to have acceleration slippage, for example, when the average of the rotational speeds of the left and right rear wheels is greater than the average of the rotational speeds of the left and right front wheels and the difference therebetween is equal to or greater than a predetermined value.

In the present example, the four wheels are assumed to have the same outer diameter. Accordingly, when the vehicle is traveling in the four-wheel drive state (in particular, when the vehicle is traveling straight and the four wheels have no slippage), the four wheels and the front-wheel-side and rear-wheel-side propeller shafts Afp and Arp rotate at the same rotational speed. Meanwhile, when the vehicle is traveling in the two-wheel drive state (in particular, when the vehicle is traveling straight and the four wheels have no slippage), the rotation of the front-wheel-side propeller shaft Afp stops (substantially) although the four wheels and the rear-wheel-side propeller shafts Arp rotate at the same rotational speed. That is, idle rotation of the front-wheel-side propeller shaft Afp is prevented (restrained). This phenomenon occurs because of the "decoupled state" of the multi-disc clutch mechanism C/T, the "disconnected state" of the changeover mechanism M, and the action of the front-wheel-side differential D/Ff. As a result, in the two-wheel drive state, drive energy required for idle rotation of the front-wheel-side propeller shaft Afp becomes unnecessary, whereby fuel efficiency is improved.

(Operation of Changeover from 2WD to 4WD)

Next, with reference to a flowchart shown in FIG. 2, operation of the drive system having the above-described configuration will be described for the case where the 2WD-to-4WD changeover condition is satisfied when the drive system is in the two-wheel drive state (the multi-disc clutch mechanism C/T is in the "decoupled state" (the multi-disc clutch transmission torque=0) and the changeover mechanism M is in the "disconnected state") (hereinafter, the operation will be referred to as "2WD-to-4WD changeover operation"). This routine is stored in ROM within the electronic control apparatus ECU, and is started and executed by a CPU within the electronic control apparatus ECU at predetermined intervals (e.g., 6 msec).

First, in step 205, the CPU determines whether or not the 2WD-to-4WD changeover condition is satisfied. When the condition is not satisfied (the CPU makes a "No" determination), the CPU ends the present routine immediately. Meanwhile, when the condition is satisfied (the CPU makes a "Yes" determination; that is, the "4WD mode" is selected and the left and right rear wheels are determined to have acceleration slippage), in step 210, the CPU increases the multi-disc clutch transmission torque. As a result, the multi-disc clutch transmission torque increases, at a predetermined increase rate, from zero toward a predetermined value (>0) corresponding to the coupled state.

In step 215, the CPU sets both flags F1 and F2 to "0" (initial value). Notably, F1=0 represents a state in which the left and right rear wheels have acceleration slippage, and F1=1 represents a state in which the left and right rear wheels have no acceleration slippage. F2=0 represents a state in which the rotational speeds of the first and second axles Afr1 and Afr2 are not (approximately) equal to each other. F2=1 represents a state in which the rotational speeds of the first and second axles Afr1 and Afr2 are (approximately) equal to each other.

In step 220, the CPU determines whether or not the left and right rear wheels have no acceleration slippage. When the left and right rear wheels have no acceleration slippage (the CPU makes a "Yes" determination), the CPU changes the value of the flag F1 from "0" to "1" in step 225. Meanwhile, when the left and right rear wheels have acceleration slippage (the CPU makes a "No" determination), the CPU maintains the flag F1 at "0," and executes E/G output reduction control in step 230.

In general, the E/G output is adjusted to a value corresponding to an operation amount of an unillustrated accelerator pedal (accelerator opening). Meanwhile, during execution of the E/G output reduction control, the E/G output is adjusted so as to change within a range below a predetermined upper limit, or is adjusted to a value which is smaller than the value corresponding to the accelerator opening by a predetermined reduction amount. The upper limit and the reduction amount are adjusted, in accordance with a predetermined pattern, on the basis of the state (degree) of acceleration slippage of the left and right rear wheels.

In step 235, the CPU determines whether or not the absolute value of the difference between the rotational speed Nfr1 of the first axle Afr1 and the rotational speed Nfr2 of the second axle Afr2 is smaller than a predetermined value (very small value); that is, whether or not the rotational speeds Nfr1 and Nfr2 are approximately equal to each other. When the rotational speeds Nfr1 and Nfr2 are approximately equal to each other (the CPU makes a "Yes" determination), the CPU changes the value of the flag F2 from "0" to "1" in step 240. Meanwhile, when the rotational speeds Nfr1 and Nfr2 are not approximately equal to each other (the CPU makes a "No" determination), the flag F2 is maintained at "0."

Notably, the rotational speed Nfr1 can be acquired on the basis of, for example, the result of detection by the wheel speed sensor Vfr of the right front wheel. The rotational speed Nfr2 can be acquired on the basis of, for example, the result of detection by the wheel speed sensor Vfl of the left front wheel and the result of detection by the front-wheel-side propeller shaft rotational speed sensor Vfp.

In step 245, the CPU determines whether or not both the values of the flags F1 and F2 are "1." When at least one of the flags F1 and F2 is maintained at "0" (the CPU makes a "No" determination), the CPU repeats the above-described exemplary processing from step 210. Meanwhile, when the values of the flags F1 and F2 are both "1" (the CPU makes a "Yes" determination), in step 250, the CPU starts an operation of switching the changeover mechanism M from the "disconnected state" to the "connected state" (hereinafter referred to as "connecting operation").

As described above, after the 2WD-to-4WD changeover condition is satisfied, start of the connecting operation is deferred until establishment of a "state in which the left and right two wheels have no acceleration slippage and the rotational speeds Nfr1, Nfr2 of the first and second axles Afr1, Afr2 are approximately equal to each other (F1=F2=1)." In a period in which start of the connecting operation is deferred in this manner, the multi-disc clutch transmission torque is increased through repeated execution of step 210. After the multi-disc clutch transmission torque reaches the above-described predetermined value, the multi-disc clutch transmission torque is maintained at the above-described predetermined value.

In addition, in the case where the left and right two wheels cause acceleration slippage in the period in which start of the connecting operation is deferred, the E/G output reduction control is executed so as to restrain the acceleration slippage. The connecting operation is started upon establishment of the "state in which the left and right two wheels have no acceleration slippage and the rotational speeds Nfr1, Nfr2 are approximately equal to each other."

Figure 2:
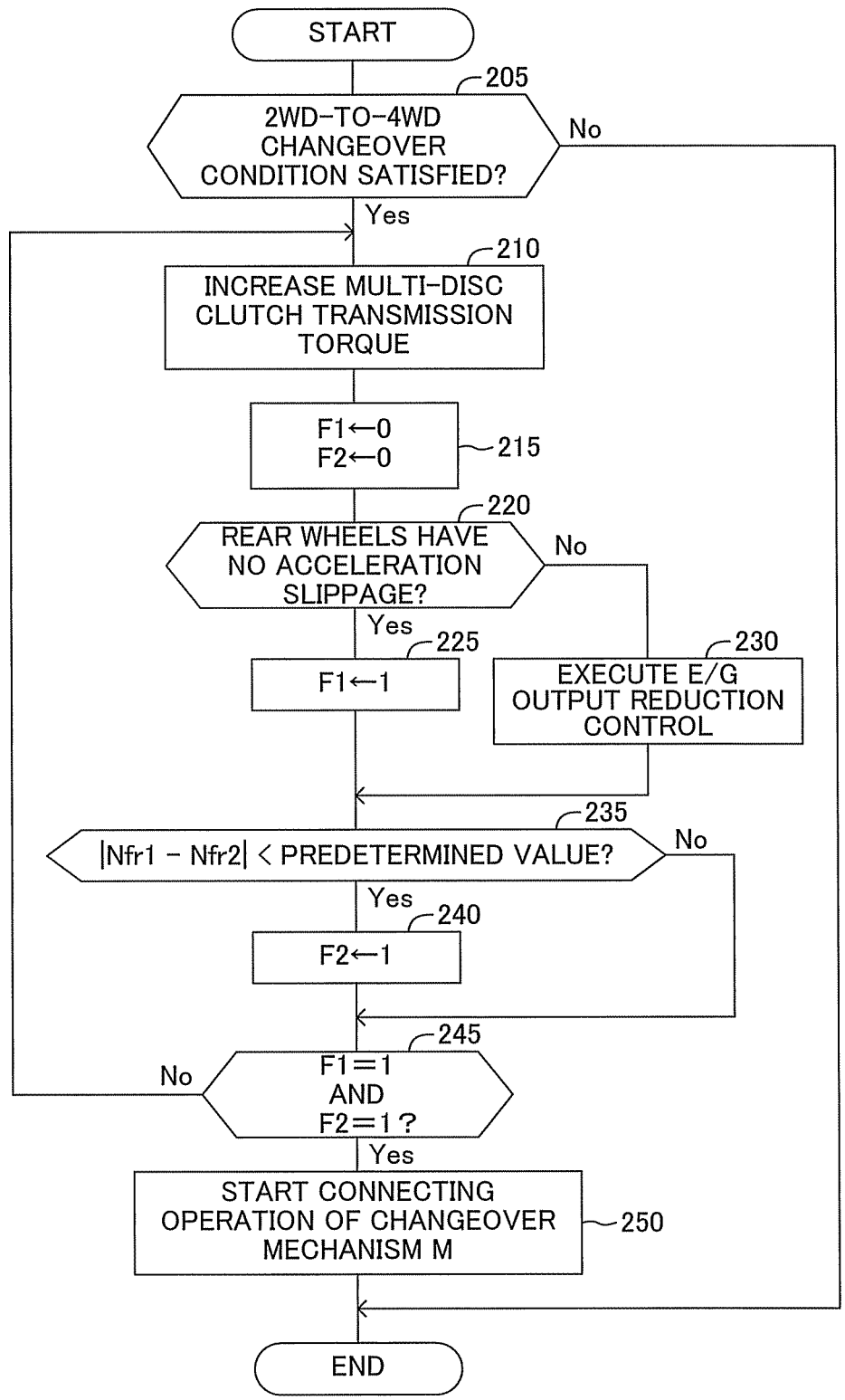
FIG. 2 is a flowchart showing a routine for performing changeover from two-wheel drive to four-wheel drive, which routine is executed by an ECU shown in FIG. 1.
Figure 3:
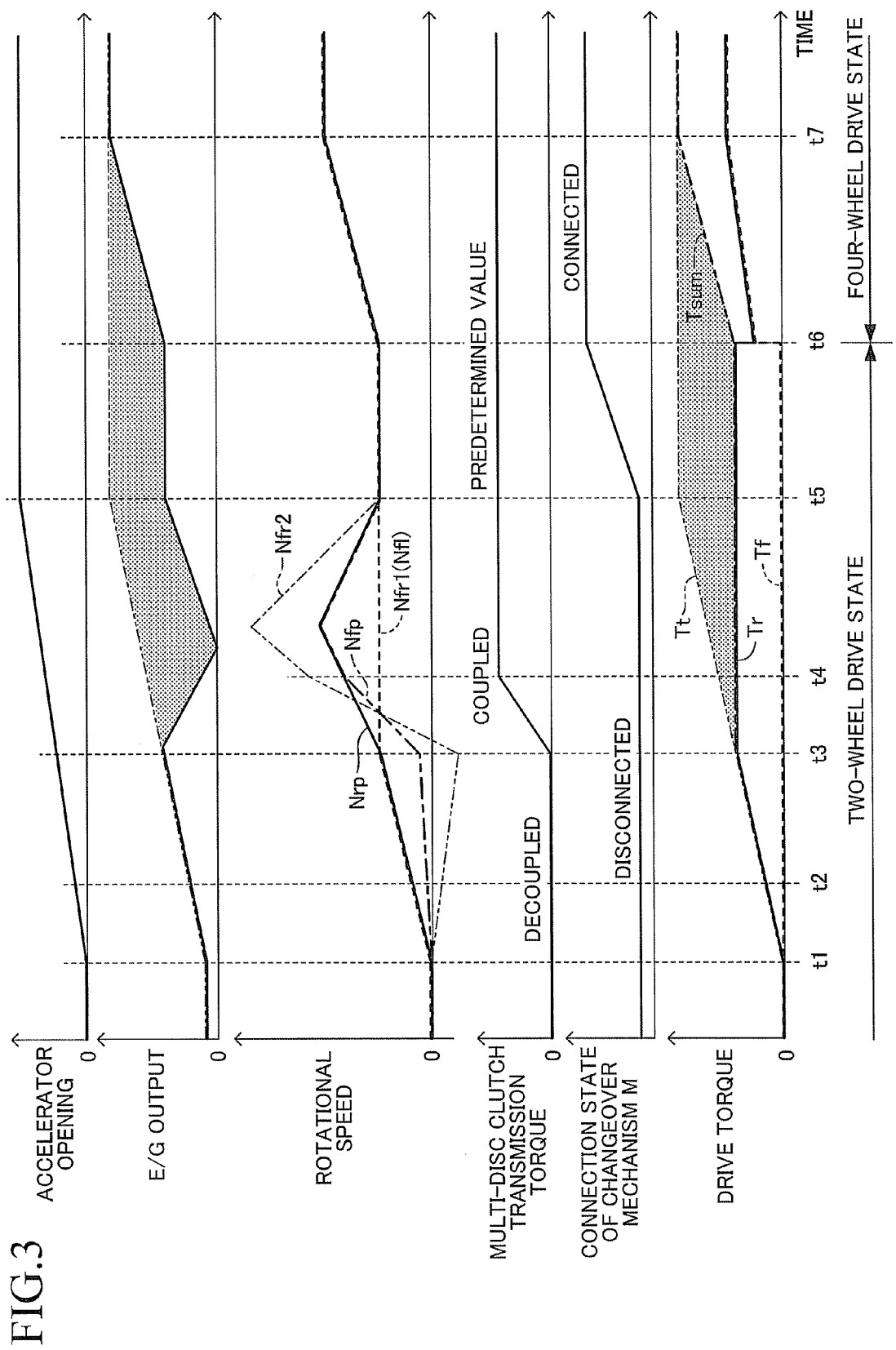
FIG. 3 is a time chart showing an example of the case where the changeover from two-wheel drive to four-wheel drive is performed in accordance with the routine shown in FIG. 2.

FIG. 3 shows an exemplary case where the 2WD-to-4WD changeover operation is performed in accordance with the routine shown in FIG. 2. In FIG. 3, Nrp (solid line) denotes the rotational speed of the rear-wheel-side propeller shaft Arp; Nfp (alternate long and short dash line) denotes the rotational speed of the front-wheel-side propeller shaft Afp; Nfrl (broken line) denotes the rotational speed of the first axle Afr1, which is a portion of the axle Afr of the right front wheel; Nfr2 (alternate long and two short dashes line) denotes the rotational speed of the second axle Afr2, which is the remaining portion of the axle Afr of the right front wheel; and Nfl (broken line) denotes the rotational speed of the axle Afl of the left front wheel. Tt (alternate long and two short dashes line) denotes a target total drive torque determined in accordance with the accelerator opening; Tr (solid line) denotes the drive torques of the left and right rear wheels; Tf (broken line) denotes the drive torques of the left and right front wheels; and Tsum (alternate long and short dash line) denotes the sum of Tr and Tf (total drive torque).

In the example shown in FIG. 3, before time t1, the 2WD/4WD changeover switch S is set to the "2WD mode," and the vehicle is stopped in the two-wheel drive state (in the rear-wheel-drive state; i.e., in a state in which the multi-disc clutch transmission torque is "0" and the changeover mechanism M is in the "disconnected state"). At time ti, the vehicle starts by means of the drive torques of the left and right rear wheels, and its speed (vehicle speed) then increases, in a straight traveling state, in accordance with the accelerator opening. At time t2, the 2WD/4WD changeover switch S is switched from the "2WD mode" to the "4WD mode." At time t3, acceleration slippage starts to occur at the left and right rear wheels. As a result, after time t3, the vehicle speed is constant even though the accelerator opening increases.

In this case, although the 2WD/4WD changeover switch S has been switched from the "2WD mode" to the "4WD mode," the 2WD-to-4WD changeover condition is not satisfied until time t3, at which acceleration slippage starts to occur at the left and right rear wheels ("No" in step 205). Accordingly, during a period from t1 to t3, the two-wheel drive state is maintained whereby the multi-disc clutch transmission torque is maintained at "0," and the changeover mechanism M is maintained in the "disconnected state." Accordingly, the drive torques of the left and right front wheels are also maintained at "0."

In addition, during the period from t1 to t3, since no acceleration slippage occurs at the left and right rear wheels (and the left and right front wheels), the rotational speeds of the four wheels increase such that the rotational speeds assume the same value, and Nrp increases such that it assumes the same value as the rotational speeds of the four wheels (accordingly, Nfr1, Nfl). Notably, during the period from t1 to t3, Nfp also increases at a very small rate within a range near zero, in accordance with an increase in the vehicle speed. This phenomenon occurs for the following reasons. First, although the multi-disc clutch C/T is in the "decoupled state," due to influence from the multi-disc clutch C/T, the second output shaft A3 (the front-wheel-side propeller shaft Afp) receives a very small drive torque as a result of rotation of the first output shaft A2 (the rear-wheel-side propeller shaft Arp). Second, due to influence from the front-wheel-side differential D/Ff, the front-wheel-side propeller shaft Afp receives a very small drive torque as a result of rotation of the axle Afl of the left front wheel. Also, during the period from t1 to t3, Nfr2 assumes a negative value (that is, the second axle Afr2 rotates in the reverse direction) because of an increase (in the positive direction) of Nfl as a result of an increase in the vehicle speed, Nfp being maintained at approximately zero, and action of the front-wheel-side differential D/Ff.

After time t3, at which acceleration slippage starts to occur at the left and right rear wheels, since the vehicle speed becomes constant, the rotational speeds of the left and right front wheels; that is, Nfr1 (=Nfl), also becomes constant. Meanwhile, even after time t3, the rotational speeds of the left and right rear wheels increase continuously because of the acceleration slippage of the left and right rear wheels. As a result, after time t3, Nrp deviates from Nfr1 (=Nfl) in the increasing direction.

At time t3, the 2WD-to-4WD changeover condition is satisfied ("Yes" in step 205). However, at time t3, acceleration slippage occurs at the left and right rear wheels ("No" in step 220; F1=0). In addition, Nfr1 assumes a positive value, and Nfr2 assumes a negative value, so that Nfr1 and Nfr2 are not approximately equal to each other ("No" in step 235; F2=0). Accordingly, at time t3, despite the satisfaction of the 2WD-to-4WD changeover condition, the connecting operation of the changeover mechanism M is not started ("No in step 245). Accordingly, even after time t3, the changeover mechanism M is maintained in the "disconnected state." That is, even after time t3, the drive torques of the left and right front wheels are maintained at "0."

Meanwhile, after time t3, at which the 2WD-to-4WD changeover condition is satisfied, the multi-disc clutch transmission torque increases from "0" (repeated execution of step 210). That is, the multi-disc clutch C/T is switched from the "decoupled state" to the "coupled state." As a result, after time t3, Nfp increases toward Nrp from a value which is approximately zero, and, as a result of this increase in Nfp, Nfr2 also increases due to action of the front-wheel-side differential D/Ff. Subsequently, at time t4, Nfp becomes equal to Nrp because the multi-disc clutch transmission torque reaches the above-described predetermined value. After time t4, since the multi-disc clutch transmission torque is maintained at the above-described predetermined value, Nfp and Nrp change such that they assume the same value. Notably, due to action of the front-wheel-side differential D/Ff, Nfr2 is smaller than Nfp until Nfp exceeds Nfl (=Nfr1), and Nfr2 becomes greater than Nfp in a period after Nfp has exceeded Nfl (=Nfr1).

In addition, after time t3, at which the 2WD-to-4WD changeover condition is satisfied, the left and right rear wheels have acceleration slippage ("No" in step 220). Accordingly, after time t3, the E/G output reduction control is executed (repeated execution of step 230). As a result of execution of the E/G output reduction control, the E/G output is adjusted to a value corresponding to the accelerator opening (alternate long and two short dashes line), whereby the acceleration slippage of the left and right rear wheels is restrained.

Accordingly, after a certain point after time t3, the rotational speeds of the left and right rear wheels, which have increased, decrease and approach the rotational speeds of the left and right front wheels. As a result, Nrp (=Nfp), which has increased, also decreases and approaches Nfr1 (=Nfl). Notably, in FIG. 3, areas indicated by fine dots represent a decrease in the E/G output and a decrease in drive torque caused by the E/G output reduction control.

At time t5, as a result of an effect of the E/G output reduction control, the acceleration slippage of the left and right rear wheels ends, and the rotational speeds of the left and right rear wheels become equal to those of the left and right front wheels. Thus, Nrp (=Nfp) becomes equal to Nfr1 (=Nfl). As a result, Nfr2 becomes equal to Nfl (=Nfr1). In this manner, at time t5, the acceleration slippage of the left and right rear wheels disappears ("Yes" in step 220; F1=1 in step 225), and Nfr1 and Nfr2 become equal to each other ("Yes" in step 235; F2=1 in step 240). Accordingly, at time t5, the connecting operation of the changeover mechanism M is started ("Yes" in step 245).

The connecting operation of the changeover mechanism M started at time t5 ends at time t6. As a result, at time t6, the changeover mechanism M is switched from the "disconnected state" to the "connected state." Also, the multi-disc clutch C/T is already maintained in the "coupled state" before time t6. Accordingly, at time t6, there can be established a state in which the changeover mechanism M is in the "connected state" and the multi-disc clutch C/T is in the "coupled state"; that is, a state in which a portion of the drive torque of the E/G is distributed to the left and right front wheels. That is, at time t6, the drive state of the vehicle changes from the two-wheel drive state to the four-wheel drive state.

In this example, the E/G output reduction control is still continued in a period of t5 to t6 for the following reason. Before time t6, the drive torque of the E/G is transmitted only to the left and right rear wheels. Therefore, if the E/G output reduction control is ended at time t5, acceleration slippage is highly likely to again occur at the left and right rear wheels.

After time t6, the E/G output, which has been reduced through the E/G output reduction control, is increased toward a value corresponding to the accelerator opening (alternate long and two short dashes line) because of the following reason. In a period after t6 in which the four-wheel drive state continues, the drive torque of the E/G is distributed to the left and right front wheels and the left and right rear wheels. Therefore, even when the E/G output reduction control is ended, acceleration slippage is unlikely to occur at the wheels. Subsequently, at time t7, the E/G output becomes equal to the value corresponding to the accelerator opening (alternate long and two short dashes line). After time t7, the E/G output is adjusted such that it becomes equal to the value corresponding to the accelerator opening (alternate long and two short dashes line).

(Action and Effects)

In the above-described drive state control apparatus according to the embodiment of the present invention, when the 2WD-to-4WD changeover condition is satisfied (time t3) while the vehicle is traveling in the two-wheel drive state, the multi-disc clutch C/T is immediately switched from the "decoupled state" to the "coupled state." Meanwhile, the connecting operation of the changeover mechanism M (operation of switching from the "disconnected state" to the "connected state") is not started until establishment of a state in which the left and right rear wheels have no acceleration slippage (that is, a state in which no rotational speed difference is produced between the front and rear wheels), as well as establishment of a state in which the rotational speed Nfr1 of the first axle Afr1 and the rotational speed Nfr2 of the second axle Afr2 are approximately equal to each other (time t5). That is, it is guaranteed that the connecting operation of the changeover mechanism M is started in a state in which the rotational speeds Nfr1 and Nfr2 are (approximately) equal to each other. Accordingly, while the vehicle is traveling in the two-wheel drive state, the connecting operation of the changeover mechanism M can be performed smoothly without use of a rotation synchronizing apparatus (synchronizer).

In addition, in the case where the left and right rear wheels have acceleration slippage after the 2WD-to-4WD changeover condition has been satisfied (after time t3), the E/G output reduction control is executed for the following reason. That is, in the case where the left and right rear wheels have acceleration slippage, the rotational speeds of the left and right rear wheels are greater than those of the left and right front wheels. Accordingly, in particular, after the multi-disc clutch transmission torque of the multi-disc clutch C/T has reached the above-described predetermined value (that is, after the rotational speed Nfp of the front-wheel-side propeller shaft Afp has become equal to the rotational speed Nrp of the rear-wheel-side propeller shaft Arp) (after time t4), the rotational speed Nfp of the front-wheel-side propeller shaft becomes greater than a "value obtained by multiplying the rotational speed Nfr1, Nfl of the left and right front wheels by a differential gear ratio." That is, the rotational speed Nfr2 of the second axle Afr2 becomes greater than the rotational speed Nfr1 of the first axle Afr1.

Accordingly, if the acceleration slippage of the left and right rear wheels continues, the state in which the rotational speed Nfr2 of the second axle is greater than the rotational speed Nfr1 of the first axle continues. As a result, there may arise a case where there cannot be established the state in which the rotational speeds Nfr1, Nfr2 of the first and second axles are (approximately) equal to each other. Accordingly, there may arise a case where the connecting operation of the changeover mechanism M cannot be started, which operation would otherwise be started upon satisfaction of the condition that the rotational speeds Nfr1, Nfr2 of the first and second axles are (approximately) equal to each other.

In consideration of the above, in the case where the left and right rear wheels have acceleration slippage when the 2WD-to-4WD changeover condition is satisfied (after time t3), the E/G output reduction control is executed. Since the drive torques of the left and right rear wheels are reduced as a result of the execution of the E/G output reduction control, the acceleration slippage of the left and right rear wheels can be restrained (time t3 to t5). Thus, there can be secured a state in which the rotational speeds Nfr1, Nfr2 of the first and second axles are approximately equal to each other (time t5). As a result, even in the case where the left and right rear wheels have acceleration slippage after satisfaction of the 2WD-to- 4WD changeover condition, the connecting operation of the changeover mechanism M can be started relatively quickly.

The present invention is not limited to the above-described embodiment, and various modifications may be employed within the scope of the present invention. For example, in the above-described embodiment, rear-wheel drive is employed as the two-wheel drive. However, front-wheel drive may be employed as the two-wheel drive. In this case, the first output shaft A2 of the transfer T/F is connected to the front-wheel-side propeller shaft Afp, the second output shaft A3 of the transfer T/F is connected to the rear-wheel-side propeller shaft Afp, and the changeover mechanism M is interposed in one of the axles Arl and Arr of the left and right rear wheels.

In the above-described embodiment, the 2WD-to-4WD changeover condition is satisfied when the "4WD mode" is selected and the left and right rear wheels are determined to have acceleration slippage. However, the embodiment may be configured such that the 2WD-to-4WD changeover condition is satisfied at a point in time when the "4WD mode" is selected, irrespective whether the left and right rear wheels (drive wheels in the two-wheel drive state) have acceleration slippage (a so-called part-time-scheme four-wheel drive system).

In the above-described embodiment, the E/G output reduction control, which reduces the E/G output, is executed so as to reduce the drive torques of the left and right rear wheels. However, a brake torque application control, which applies braking torques to the left and right rear wheels, may be executed so as to reduce the drive torques of the left and right rear wheels (with the E/G output being maintained).

In the above-described embodiment, the front-wheel-side propeller shaft rotational speed sensor Vfp is provided so as to detect the rotational speed Nfr2 of the second axle Afr2. However, the front-wheel-side propeller shaft rotational speed sensor Vfp may be omitted. In such a case, under the condition that the multi-disc clutch transmission torque assumes the above-described predetermined value (accordingly, the rotational speeds Nfp, Nrp of the front-wheel-side and rear-wheel-side propeller shafts are equal to each other), Nfr2 can be obtained from the rotational speeds of the left front wheel and the left and right rear wheels detected by the wheel speed sensors Vfl, Vrl, Vrr.

In the above-described embodiment, when the 2WD-to-4WD changeover condition is satisfied, a determination is made as to whether the left and right rear wheels have acceleration slippage, and the E/G output reduction control is executed when the left and right rear wheels have acceleration slippage. However, the determination as to whether the left and right rear wheels have acceleration slippage and the E/G output reduction control may be omitted. This configuration is particularly effective for the case where, before the 2WD-to-4WD changeover condition is satisfied, it is determined in advance that the left and right rear wheels (drive wheels in the two-wheel drive state) are unlikely to cause acceleration slippage, from information provided by road surface state detection means and/or traveling state detection means.

Preferably, the above-described embodiment is configured as follows. In the case where, after satisfaction of the 2WD-to-4WD changeover condition, the connecting operation of the changeover mechanism M is not started (that is, the rotational speeds Nfr1 and Nfr2 do not become approximately equal to each other) within a predetermined time despite the E/G output reduction control having reduced the E/G output sufficiently (by a predetermined amount or greater) and the multi-disc clutch transmission torque having increased sufficiently (by a predetermined amount or greater), the switching from 2WD to 4WD during traveling is interrupted, and such interruption is reported to the driver by display means such as an indicator.

Preferably, the above-described embodiment is configured such that, when a time over which the connecting operation of the changeover mechanism M continues exceeds a predetermined time, the state in which the E/G output has been reduced by the E/G output reduction means is maintained for a predetermined time.

In the above-described embodiment, as described above, all the four wheels are assumed to have the same outer diameter. However, in the case where the front and rear wheels have different outer diameters, the rotational speeds Nfr1, Nfr2 of the first and second axles Afr1, Afr2 do not become equal to each other if the vehicle travels. Accordingly, preferably, means for detecting that the front and rear wheels differ in outer diameter is provided, and the embodiment is configured such that, upon detection that the front and rear wheels differ in outer diameter, the switching from 2WD to 4WD during traveling is interrupted, and such interruption is reported to the driver by display means such as an indicator.

In the above-described embodiment, the routine shown in FIG. 2 is employed, and the operation of increasing the multi-disc clutch transmission torque is continued after the 2WD-to-4WD changeover condition is satisfied, irrespective of whether or not the rotational speed Nfr2 of the second axle Afr2 is equal to or greater than the rotational speed Nfr1 of the first axle Afr1 (see step 210 and FIG. 3). In place of the routine shown in FIG. 2, a routine shown in FIG. 4 in the form of a flowchart may be employed. The routine shown in FIG. 4 differs from the routine shown in FIG. 2 only in the point that step 210 of FIG. 2 is removed, and steps 405 and 410 (see thick frames) are added. The detailed description of the routine shown in FIG. 4 is omitted.

Figure 4:
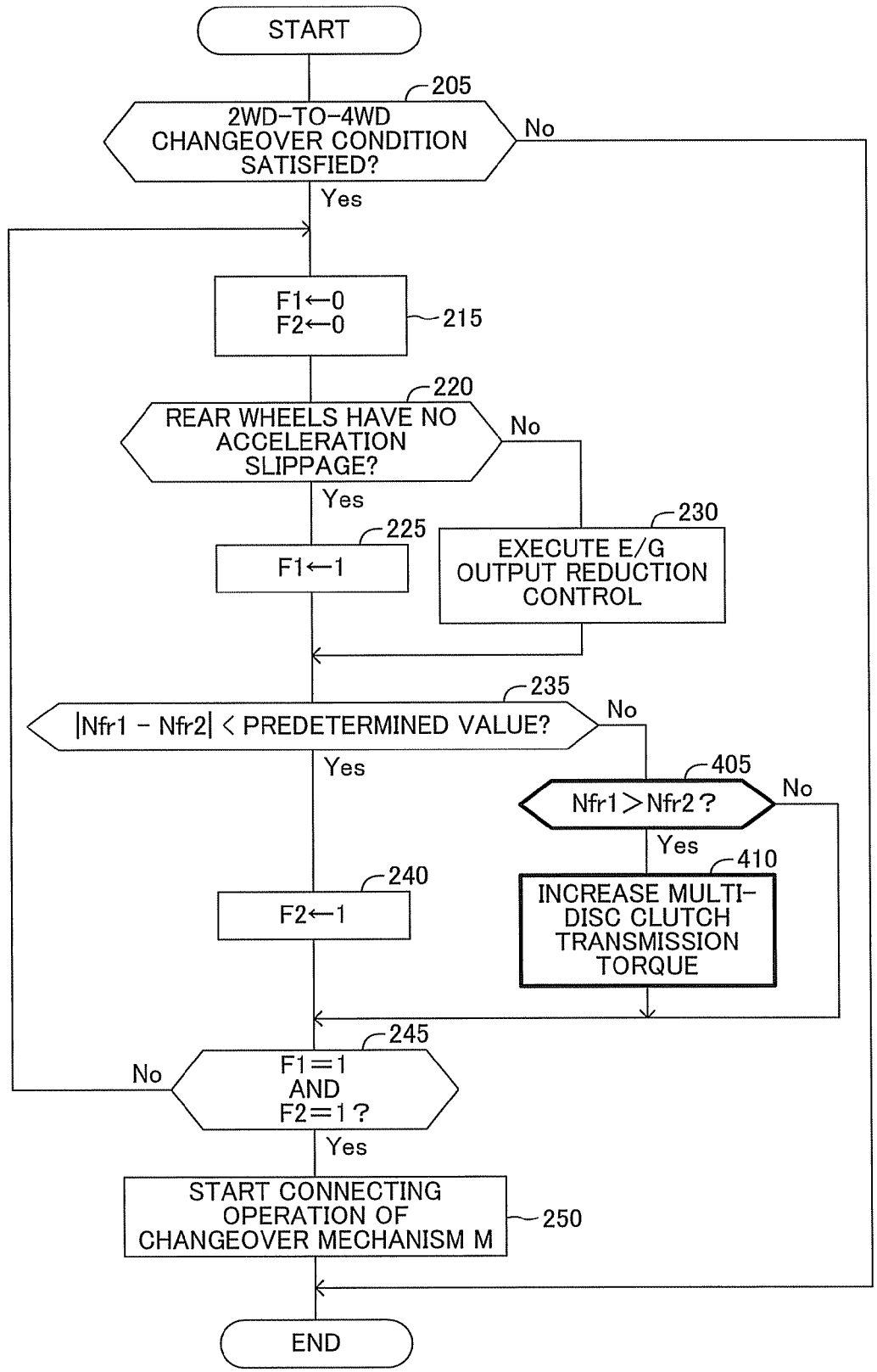
FIG. 4 is a flowchart showing a routine for performing changeover from two-wheel drive to four-wheel drive, which routine is executed by an ECU of a drive state control apparatus according to a modification of the embodiment of the present invention.

In the case where the routine shown in FIG. 4 is employed, after the 2WD-to-4WD changeover condition is satisfied, the operation of increasing the multi-disc clutch transmission torque is continued when Nfr2 is less than Nfr1, and is not performed when Nfr2 is equal to or greater than Nfr1.

In the above-described embodiment, the sub-transmission mechanism Z is provided within the transfer T/F. However, the sub-transmission mechanism Z may be omitted. In the above-described embodiment, the multi-disc clutch C/T is employed as the first changeover mechanism within the transfer T/F, and the changeover mechanism M (dog-type clutch mechanism) is employed as the second changeover mechanism (see FIG. 1). However, the above-embodiment may be modified such that the changeover mechanism M (dog-type clutch mechanism) is employed as the first changeover mechanism, and the multi-disc clutch C/T is employed as the second changeover mechanism (see FIG. 5).

Figure 6:
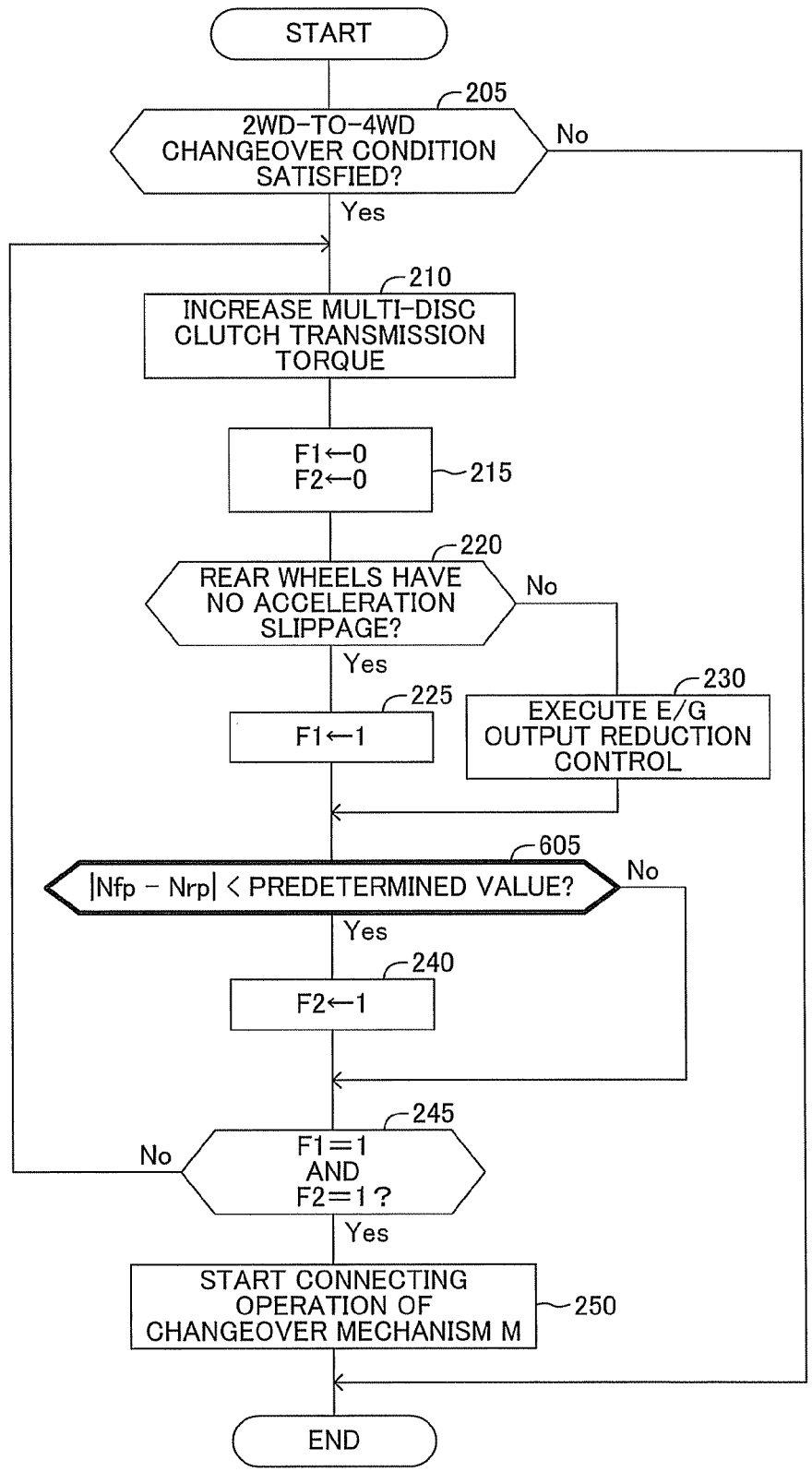
FIG. 6 is a flowchart relating to another modification of the embodiment of the present invention and corresponding to FIG. 2.
Figure 7:
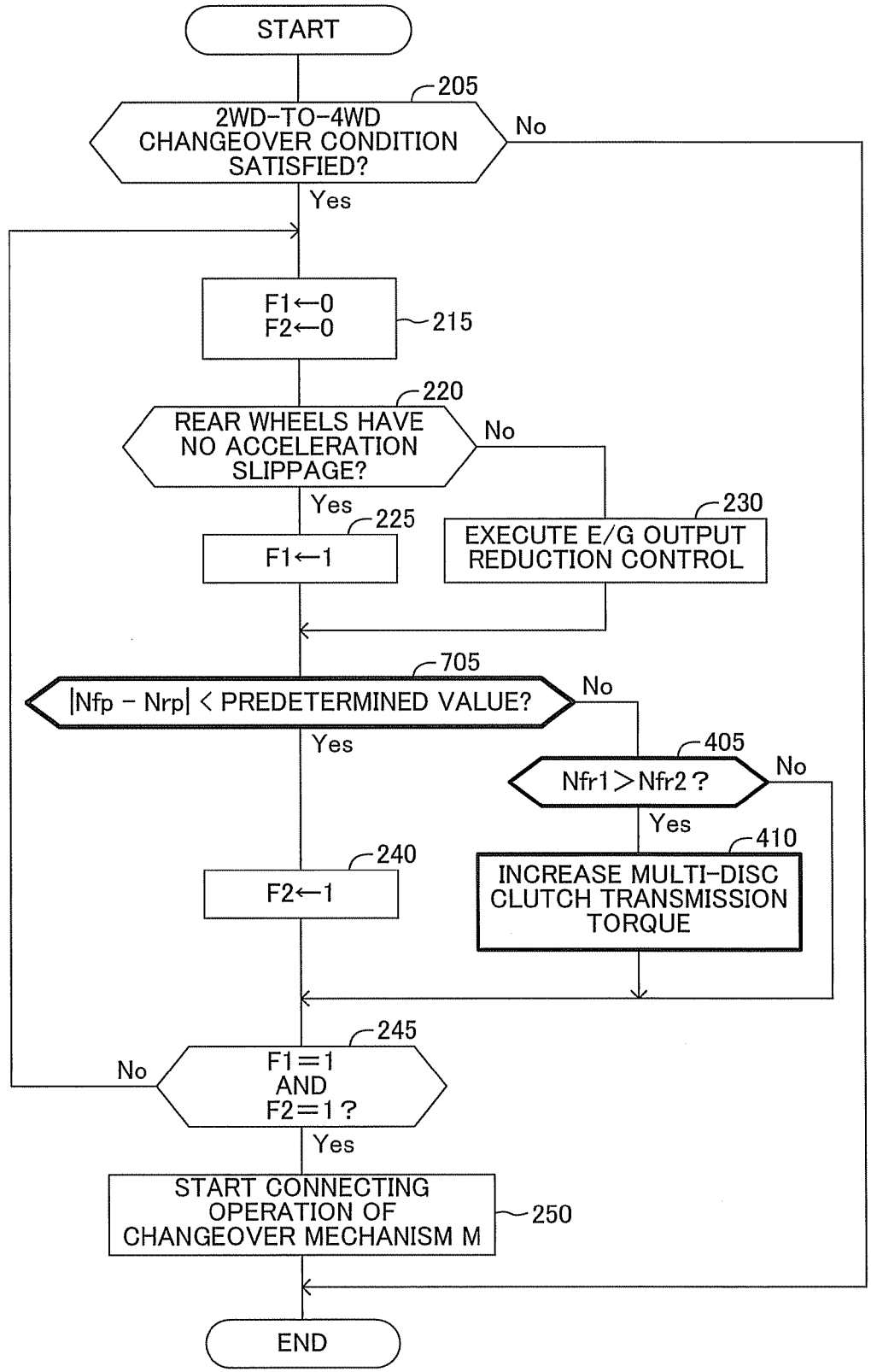
FIG. 7 is a flowchart relating to another modification of the embodiment of the present invention and corresponding to FIG. 4.

In this case, in place of the routines shown in FIGS. 2 and 4, routines shown in FIGS. 6 and 7 in the form of flowcharts are employed. The routine shown in FIG. 6 differs from the routine shown in FIG. 2 only in the point that step 235 of FIG. 2 is replaced with step 605. The routine shown in FIG. 7 differs from the routine shown in FIG. 4 only in the point that step 235 of FIG. 4 is replaced with step 705.

In step 605 of FIG. 6 and step 705 of FIG. 7, Nfp denotes the rotational speed of the front-wheel-side propeller shaft Afp (=the rotational speed of the second output shaft A3), and Nrp denotes the rotational speed of the rear-wheel-side propeller shaft Arp (=the rotational speed of the first output shaft A2). Notably, Nfp can be detected from the result of detection by the front-wheel-side propeller shaft rotational speed sensor Vfp. Nrp can be detected from the results of detection by the wheel speed sensors Vrr, Vrl for the left and right rear wheels. The detailed description of the routines shown in FIGS. 6 and 7 is omitted.

Figure 5:
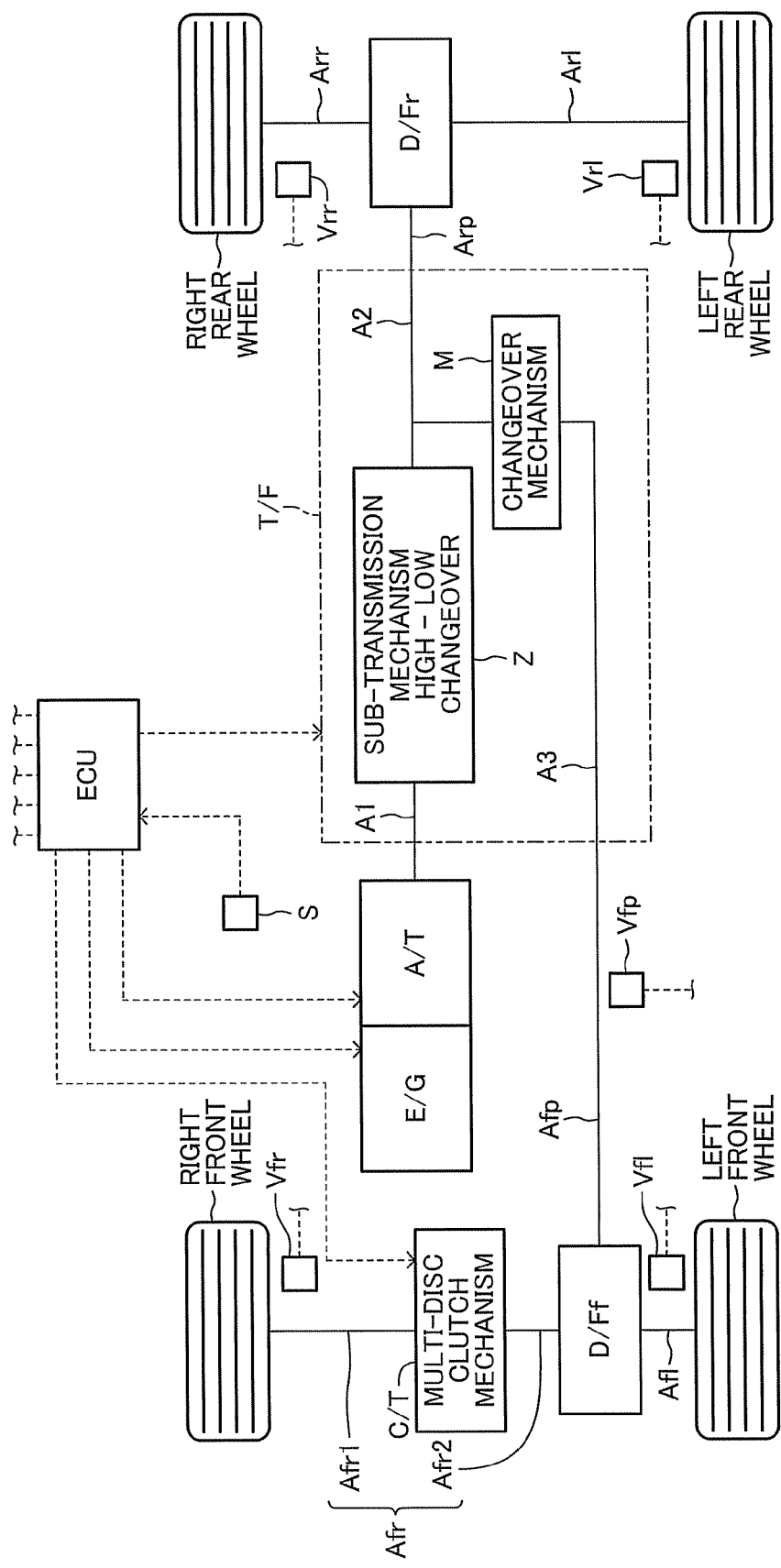
FIG. 5 is a diagram relating to another modification of the embodiment of the present invention and corresponding to FIG. 1.

In the case of the drive state control apparatus shown in FIG. 5 (see FIGS. 6 and 7), in the case where the 2WD-to-4WD changeover condition is satisfied while the vehicle is traveling in the two-wheel drive state, the multi-disc clutch C/T, which serves as the second changeover mechanism, is immediately switched from the "decoupled state" to the "coupled state." Meanwhile, the connecting operation (operation of switching from the "disconnected state" to the "connected state") of the changeover mechanism M, which serves as the first changeover mechanism, is not started until a state in which the left and right rear wheels have no acceleration slippage (that is, a state in which no rotational speed difference is produced between the front and rear wheels) is established and a state in which the rotational speeds Nfp, Nrp of the front-wheel-side and rear-wheel-side propeller shafts Afp, Arp (that is, the rotational speeds of the first and second output shafts A2, A3) are approximately equal to each other is established. That is, it is guaranteed that the connecting operation of the changeover mechanism M, which serves as the first changeover mechanism, is started in a state in which the rotational speeds Nfp and Nrp are (approximately) equal to each other. While the vehicle is traveling in the two-wheel drive state, the connecting operation of the changeover mechanism M, which serves as the first changeover mechanism, can be performed smoothly without use of a rotation synchronizing apparatus (synchronizer).

What is claimed is:

1. A drive state control apparatus applied for a vehicle which comprises:
    a transfer which includes an input shaft connected to an output shaft of a transmission connected to a power source of the vehicle, a first output shaft connected to a first propeller shaft, which is one of front-wheel-side and rear-wheel-side propeller shafts of the vehicle, a second output shaft connected to a second propeller shaft, which is the other of the front-wheel-side and rear-wheel-side propeller shafts, and a first changeover mechanism which is switchable between a first state in which a power transmission system is formed only between the input shaft and the first output shaft and a second state in which power transmission systems are formed between the input shaft and the first and second output shafts;
    a first differential which is connected to the first propeller shaft and distributes torque of the first propeller shaft to first left and right wheels, which are left and right front wheels or left and right rear wheels, via axles of the first left and right wheels, while allowing difference in rotational speed between the first left and right wheels;
    a second differential which is connected to the second propeller shaft and distributes torque of the second propeller shaft to second left and right wheels, which are the remaining left and right wheels, via axles of the second left and right wheels, while allowing difference in rotational speed between the second left and right wheels;
    a second changeover mechanism which is interposed in an axle of a specific wheel, which is one of the second left and right wheels, and is switchable between a connected state in which a power transmission system is formed between the specific wheel and the second differential, and a disconnected state in which no power transmission system is formed between the specific wheel and the second differential,
    determination means for determining whether or not slippage in an acceleration direction is occurring in at least one of the first left and right wheels; and
    reduction means for reducing drive torques of the first left and right wheels upon determination that the slippage is occurring when the changeover condition is satisfied,
    wherein the vehicle travels in a two-wheel drive state when the first changeover mechanism is in the first state and the second changeover mechanism is in the disconnected state, and travels in a four-wheel drive state when the first changeover mechanism is in the second state and the second changeover mechanism is in the connected state,
    the drive state control apparatus comprising:
    first rotational speed acquisition means for acquiring rotational speed of a first axle, which is a portion of the axle of the specific wheel located between the second changeover mechanism and the specific wheel;
    second rotational speed acquisition means for acquiring rotational speed of a second axle, which is a portion of the axle of the specific wheel located between the second changeover mechanism and the second differential; and
    control means for controlling the first changeover mechanism and the second changeover mechanism,
    wherein the control means is configured such that, when a condition for changeover from the two-wheel drive state to the four-wheel drive state is satisfied while the vehicle is traveling in the two-wheel drive state, the control means switches the first changeover mechanism from the first state to the second state, and starts a connecting operation for switching the second changeover mechanism from the disconnected state to the connected state, upon determination that a difference between the acquired rotational speeds of the first and second axles is less than a predetermined value,
    wherein the first changeover mechanism is a multi-disc clutch mechanism which is switchable between a decoupled state in which no power transmission system is formed between the first output shaft and the second output shaft whereby the first state is established, and a coupled state in which a power transmission system is formed between the first output shaft and the second output shaft whereby the second state is established, the multi-disc clutch mechanism being capable of adjusting a maximum torque which can be transmitted in the coupled state; and
    the second changeover mechanism is a dog-type clutch mechanism which is selectively brought into the connected state and the disconnected state, and
    wherein the reduction means is configured to maintain a state in which the drive torques of the first left and right wheels are reduced until a switching of the dog-type clutch mechanism from the disconnected state to the connected state is concluded.

2. A drive state control apparatus according to claim 1, wherein the reduction means is configured to reduce the drive torques by reducing torque input to the input shaft of the transfer.

3. A drive state control apparatus according to claim 2, wherein the reduction means is configured to reduce the drive torques by reducing output of the power source.

4. A drive state control apparatus according to claim 1, wherein the first propeller shaft is the rear-wheel-side propeller shaft; the second propeller shaft is the front-wheel-side propeller shaft; the first left and right wheels are the left and right rear wheels; and the second left and right wheels are the left and right front wheels.

\* \* \* \* \*